United States Patent
Oota et al.

(10) Patent No.: US 10,654,755 B2
(45) Date of Patent: May 19, 2020

(54) OUTER PERIPHERAL COATING MEMBER AND CERAMIC PRODUCT

(71) Applicant: DENSO CORPORATION, Kariya, Aichi-pref. (JP)

(72) Inventors: Mitsunori Oota, Kariya (JP); Emi Hattori, Gifu (JP); Keiichi Kato, Nagoya (JP)

(73) Assignee: DENSO CORPORATION, Kariya (JP)

( * ) Notice: Subject to any disclaimer, the term of this patent is extended or adjusted under 35 U.S.C. 154(b) by 286 days.

(21) Appl. No.: 15/568,156

(22) PCT Filed: Apr. 8, 2016

(86) PCT No.: PCT/JP2016/061594
§ 371 (c)(1),
(2) Date: Oct. 20, 2017

(87) PCT Pub. No.: WO2016/171016
PCT Pub. Date: Oct. 27, 2016

(65) Prior Publication Data
US 2018/0118629 A1    May 3, 2018

(30) Foreign Application Priority Data
Apr. 23, 2015    (JP) ................................. 2015-088463

(51) Int. Cl.
*C04B 35/622* (2006.01)
*B01J 35/04* (2006.01)
(Continued)

(52) U.S. Cl.
CPC ......... *C04B 35/62222* (2013.01); *B01J 23/20* (2013.01); *B01J 35/04* (2013.01); *C04B 41/009* (2013.01); *C04B 41/5041* (2013.01); *C04B 41/87* (2013.01); *F01N 3/035* (2013.01); *F01N 3/28* (2013.01); *F01N 3/2825* (2013.01); *B01J 23/002* (2013.01); *B01J 23/6484* (2013.01);
(Continued)

(58) Field of Classification Search
None
See application file for complete search history.

(56) References Cited

U.S. PATENT DOCUMENTS

| 5,958,829 A * | 9/1999 | Domesle | B01D 53/945 |
| | | | 423/213.5 |
| 2011/0224071 A1 | 9/2011 | Okumura et al. | |
| 2016/0074800 A1* | 3/2016 | Ito | B01D 46/2462 |
| | | | 428/117 |

FOREIGN PATENT DOCUMENTS

| JP | 2007-209898 | 8/2007 |
| JP | 2015-083288 | 4/2015 |

OTHER PUBLICATIONS

International Search Report for PCT/JP2016/061594, dated Jun. 21, 2016, 4 pages.

* cited by examiner

*Primary Examiner* — David Sample
*Assistant Examiner* — Elizabeth Collister
(74) *Attorney, Agent, or Firm* — Nixon & Vanderhye PC

(57) ABSTRACT

An outer peripheral coating member contains first particles containing titanium oxide, second particles containing zirconium oxide, third particles containing niobium oxide or aluminum oxide, and a dispersion medium. It is preferable for the first particles to have at least two peak values R1 in a distribution of particle sizes of the first particles. One of the peak values R1 is within a range of 1 to 50 nm, and the other peak value R1 is within a range of 100 to 500 nm.

8 Claims, 2 Drawing Sheets

(51) Int. Cl.
*C04B 41/87* (2006.01)
*F01N 3/28* (2006.01)
*B01J 23/20* (2006.01)
*C04B 41/50* (2006.01)
*F01N 3/035* (2006.01)
*C04B 41/00* (2006.01)
*C04B 111/82* (2006.01)
*B01J 23/00* (2006.01)
*B01J 23/648* (2006.01)
*B01J 37/02* (2006.01)

(52) U.S. Cl.
CPC ........ *B01J 37/0215* (2013.01); *B01J 2523/00* (2013.01); *C04B 2111/82* (2013.01); *F01N 2510/02* (2013.01)

OUTER PERIPHERAL COATING MEMBER AND CERAMIC PRODUCT

This application is the U.S. national phase of International Application No. PCT/JP2016/061594 filed 8 Apr. 2016, which designated the U.S. and claims priority to JP Patent Application No. 2015-088463 filed 23 Apr. 2015, the entire contents of each of which are hereby incorporated by reference.

TECHNICAL FIELD

The present invention relates to outer peripheral coating members and ceramic products with a coated layer made of the outer peripheral coating member.

BACKGROUND ART

Catalysts, to be used as exhaust gas purification for motor vehicles, have a structure in which a base member made of ceramics supports catalyst components. Because there are various kinds of catalyst components to be used for exhaust gas purification according to intended purposes and usage methods, it is difficult to select a target catalyst by its appearance. In order to avoid this problem, identification information regarding the catalyst to be used to purify exhaust gas, is often marked on an outer peripheral surface of the base member.

There has been proposed a marking method which applies an outer peripheral coating member containing titanium oxide onto an outer periphery of the base member to form a coated layer, and which irradiates a laser beam onto the coated layer (see Patent document 1). This marking method generates a black color in the area irradiated by the laser beam on the coated layer.

CITATION LIST

Patent Literature

[Patent document 1] Japanese patent laid open publication No. JP 2011-206764.

SUMMARY OF INVENTION

Technical Problem

Such catalysts for exhaust gas purification are often placed at a high temperature (for example, within a range of 850 to 900° C.). The conventional marking method described in patent document 1 deteriorates the quality of the black colored area, i.e. the black colored area fades due to the high temperature environment.

The present invention has been made in consideration of the foregoing environments, and it is an object of the present invention to provide an outer peripheral coating member and a ceramic product using the outer peripheral coating member. The outer peripheral coating member has a function of excellent color fade resistance even if placed under high temperature environments.

Solution to Problem

The outer peripheral coating member according to the present invention contains first particles, second particles and third particles. The first particles contain titanium oxide, the second particles contain zirconium oxide, and the third particles contain niobium oxide or aluminum oxide.

It is possible to apply the outer peripheral coating member according to the present invention onto a surface of ceramic member to form a coated layer. For example, it is acceptable to apply the outer peripheral coating member according to the present invention onto another member other than the ceramic member, and to print the coated layer on the surface of the ceramic member.

For example, when a laser beam is irradiated onto an area on the coated layer, a color of the area changes. Hereinafter, the laser-irradiated area will be referred to as a colored area on the coated layer. The marking forms a pattern on the ceramic member, for example. The marking is performed by forming the colored area with a predetermined pattern on the coated layer.

A ceramic member with such a coated layer made of the outer peripheral coating member according to the present invention has excellent color fade resistance even if the ceramic member with the coated layer is treated at a high temperature after the laser beam has been irradiated on the coated layer.

A first ceramic product according to another exemplary embodiment of the present invention has the ceramic member. In particular, the ceramic member is formed on the surface of the ceramic member, and the coated layer is formed on the ceramic member by applying the outer peripheral coating member according to the present invention to the surface of the ceramic member.

For example, the laser beam is irradiated on an area of the coated layer, the color of the laser-irradiated area on the coated layer is changed to produce a colored area. The marking process on the ceramic member is performed by forming the colored area in a predetermined pattern. Accordingly, the first ceramic product according to the present invention has excellent color fade resistance even if the first ceramic product is heated at a high temperature after the laser-beam irradiation.

A second ceramic product according to another exemplary embodiment of the present invention has the ceramic member. In particular, a layer formed on a surface of the ceramic member has the first particles, the second particles and the third particles. The first particles contain titanium oxide, the second particles contain zirconium oxide, and the third particles contain niobium oxide or aluminum oxide.

For example, if laser beam are irradiated on an area of the layer formed on the ceramic member, the color of the laser-irradiated area on the ceramic member is changed to produce a colored area. The marking on the ceramic member is performed by forming the colored area in a predetermined pattern. Accordingly, the second ceramic product according to the present invention has excellent color fade resistance even if the second ceramic product is heated at a high temperature after the laser-beam irradiation.

DESCRIPTION OF EMBODIMENTS

Next, a description will be given of exemplary embodiments according to the present invention. For example, it is acceptable to use titanium oxide, or to use particles of another component instead of using titanium oxide as the first particles which form the coated layer formed on the ceramic member. It is preferable for the first particles to have an average particle size within a range of 1 to 200 nm. This range of the average particle size of the first particles further increases color development properties of the coated layer. The average particle size of the first particles were measured on the basis of transmission electron microscope photographs of the parts on the ceramic member, on which the outer peripheral coating member has been applied, by using an image analysis apparatus.

Figure 1:
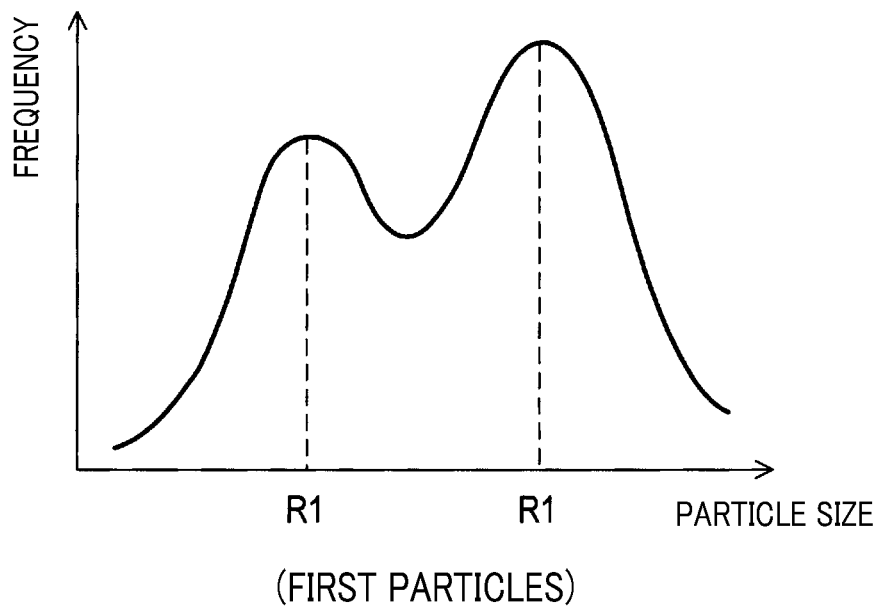
FIG. 1 is a graph showing an example of a distribution of first particles which form a coated layer on a surface of a ceramic member according to the present invention.

It is preferable for the first particles to have not less than two peak values R1 in a distribution of particle sizes thereof. FIG. 1 shows a distribution of particle sizes of the first particles in which the horizontal axis represents the particle sizes of the first particles, and the horizontal axis represents frequency (number) of the first particles having a predetermined particle size in a constant area. FIG. 1 shows the two peak values R1 of particle sizes of the first particles. That is, the example shown in FIG. 1 shows the two peak values R1 of particle sizes of the first particles.

The distribution of particle sizes of the first particles were calculated on the basis of transmission electron microscope photographs of the parts on the ceramic member, on which the outer peripheral coating member has been applied, by using an image analysis apparatus.

It is preferable for one of the two peak values R1 of particle sizes of the first particles to be within a range of 1 to 50 nm, and more preferable to be within a range of 2 to 20 nm, most preferable to be within a range of 5 to 10 nm.

Further, It is preferable for the other peak value R1 to be within a range of 100 to 500 nm, and more preferable to be within a range of 150 to 350 nm, and most preferable to be within a range of 200 to 280 nm. The ranges of the peak values R1 previously described further increase the color development properties and the heat resistance properties of the coated layer.

For example, it is acceptable to use particles of zirconium oxide or particles of another component in addition to zirconium oxide as the second particles to be used for forming the coated layer on the surface of the ceramic member by using the outer peripheral coating member according to the present invention. It is preferable for the second particles to have an average particle size within a range of 1 to 100 nm, and more preferable to have an average particle size within a range of 2 to 60 nm.

This range of the average particle size further increases color development properties and heat resistance properties of the coated layer. The average particle size of the second particles were measured on the basis of transmission electron microscope photographs of the parts on the ceramic member, on which the outer peripheral coating member has been applied, by using an image analysis apparatus.

For example, it is acceptable to use particles of niobium oxide, or particles of aluminum oxide, or particles containing niobium oxide and aluminum oxide as the third particles to be used for forming the coated layer on the surface of the ceramic member by using the outer peripheral coating member according to the present invention.

It is further acceptable for the third particles to contain another component in addition to niobium oxide and aluminum oxide. It is acceptable to use a mixture of particles of niobium oxide and alumina oxide as the third particles.

It is preferable for the third particles to have an average particle size within a range of 1 nm to 300 μm. This range of the average particle size further increases color development properties and heat resistance properties of the coated layer. The average particle size of the third particles was measured on the basis of transmission electron microscope photographs of the parts on the ceramic member, on which the outer peripheral coating member has been applied, by using an image analysis apparatus.

Figure 2:
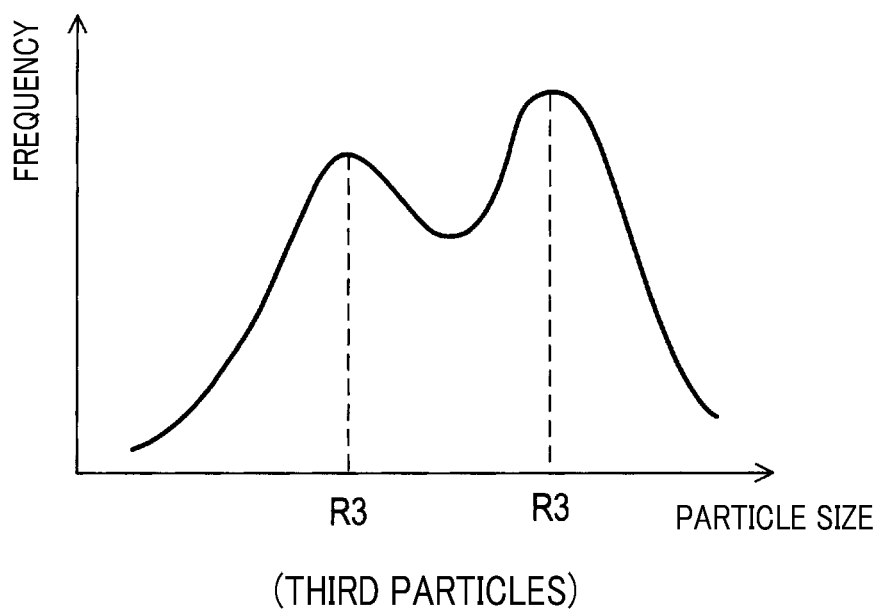
FIG. 2 is a graph showing an example of a distribution of third particles which form a coated layer on a surface of a ceramic member according to the present invention.

It is preferable for the third particles to have not less than two peak values R3 in a distribution of particle sizes of the third particles. FIG. 2 shows a distribution of particle sizes of the third particles in which the horizontal axis represents the particle sizes of the third particles, and the horizontal axis represents frequency (number) of the third particles having a predetermined particle size in a constant area. FIG. 2 shows the two peak values R3 of particle sizes of the third particles. That is, the example shown in FIG. 2 shows the two peak values R3 of particle sizes of the third particles.

The distribution of particle sizes of the third particles was calculated on the basis of transmission electron microscope photographs of the parts on the ceramic member, on which the outer peripheral coating member has been applied, by using an image analysis apparatus.

It is preferable for one of the two peak values R3 in the distribution of particle sizes of the third particles to be within a range of 1 to 100 nm, and more preferable to be within a range of 5 to 50 nm, most preferable to be within a range of 10 to 20 nm.

Further, It is preferable for the other peak value R3 of particle sizes of the third particles to be within a range of 0.15 to 300 μm, and more preferable to be within a range of 0.2 to 150 μm, and most preferable to be within a range of 0.3 to 2.5 μm, or a range of 30 to 70 μm. The ranges of the two peak values R3 of particle sizes of the third particles previously described further increase the color development properties and the heat resistance properties of the coated layer.

It is preferable for titanium, zirconium, niobium and aluminum contained in the outer peripheral coating member according to the present invention to have an atomic mole ratio within one of the following ranges (1) to (3). This structure makes it possible to more increase the color development properties and the heat resistance properties of the coated layer.

(1) The atomic mole ratio has a range of 0.01 to 0.5 mole of zirconium atoms to 1 mole of titanium atoms. It is more preferable for the atomic mole ratio to have a range of 0.02 to 0.3 mole of zirconium atoms to 1 mole of titanium atoms. It is most preferable for the atomic mole ratio to have a range of 0.01 to 0.05 mole or 0.1 to 0.15 mole of zirconium atoms to 1 mole of titanium atoms.

(2) The atomic mole ratio has a range of 0.1 to 0.15 mole of zirconium atoms, and a range of 0.03 to 2.5 mole of niobium atoms or aluminum atoms, to 1 mole of titanium atoms. It is more preferable for the atomic mole ratio to have a range of 0.1 to 0.15 mole of zirconium atoms, and a range of 0.05 to 1.0 mole of niobium atoms or aluminum atoms, to 1 mole of titanium atoms, and most preferable to have a range of 0.1 to 0.3 mole of niobium atoms or aluminum atoms to 1 mole of titanium atoms.

The atomic mole ratio has a range of 0.01 to 0.05 mole of zirconium atoms, and a range of 0.02 to 0.1 mole of niobium atoms, to 1 mole of titanium atoms.

It is more preferable for the atomic mole ratio to have a range of 0.01 to 0.05 mole of zirconium atoms, and a range of 0.03 to 0.08 mole of niobium atoms, to 1 mole of titanium atoms, and most preferable to have a range of 0.04 to 0.07 mole of niobium atoms to 1 mole of titanium atoms.

The present invention does not limit a dispersion medium. For example, it is possible to use, as the dispersion medium, water, alcohol (methanol, ethanol, IPA (Isopropyl alcohol), etc.), various organic solvents, etc. Use of a dispersion medium having high volatility makes it possible to reduce a length of time necessary for drying the outer peripheral coating member after the outer peripheral coating member is applied on the outer periphery of the base member.

It is possible for the outer peripheral coating member previously described to further contain a synthetic resin. This structure makes it possible to prevent liquid (for example, catalyst slurry) from seeping out from the ceramic member when the coated layer is formed on the surface of the ceramic member (for example, catalyst base member) by using the outer peripheral coating member containing such a synthetic resin.

Further, the outer peripheral coating member containing such a synthetic resin allows the outer peripheral coating member to increase a degree in clear of the colored area. There are, as the synthetic resin, acrylic resin, acrylic silicon resin, vinyl acetate resin, polyvinyl alcohol resin, etc. It is also acceptable to use synthetic resin emulsions. It is preferable for the synthetic resin to have a chemical composition within a range of 10 to 30 weight parts per 100 weight parts of non-volatile component contained in the outer peripheral coating member. This range of the synthetic resin can provide superior effects of the coated layer previously described.

Further, it is possible for the outer peripheral coating member to have a thickener. Use of such a thickener suppresses sedimentation of the first particles, the second particles and the third particles in the outer peripheral coating member. For example, it is possible to use a usual thickener which is used in a usual coating member, for example, methylcellulose, hydroxyethyl cellulose, urethane resin, etc.

It is preferable for the thickener to have a chemical composition within a range of 0.1 to 10 weight parts per 100 weight parts of non-volatile component contained in the outer peripheral coating member. This range of the thickener more suppresses sedimentation of the first particles, the second particles and the third particles in the outer peripheral coating member.

It is possible for the outer peripheral coating member to further contain ultraviolet (UV) fluorescent agent. When the coated layer is formed by applying the outer peripheral coating member containing such UV fluorescent agent onto the surface of the base member, the coated layer fluoresces by irradiation of ultraviolet on the coated layer. This makes it possible for a person to easily recognize the area of the coated layer formed on a ceramic product.

Still further, it is possible for the outer peripheral coating member to contain defoaming agent, wetting agent, film forming agent, dispersion agent, etc., for example. There are, as such film forming agent, mineral oil, nonionic surfactant of polyalkylene glycol type, polyether, hydrophobic silica mixture, silicone-based compound emulsion.

For example, there are, as such a wetting agent, alkyl alcohol ethylene oxide adducts, etc. For example, there are, as such a film forming agent, 2,2,4-trimethyl-1,3-pentanediol, dipropyleneglycol mono-n-butyl ether, propylene glycol b-butyl ether, propyleneglycol monomethyl ether, etc. For example, there are, as such a dispersion agent, polycarboxylic acids, etc.

For example, it is possible to apply the outer peripheral coating member onto the surface of the ceramic member. This forms the coated layer on the ceramic member. It is acceptable to form the ceramic member on the entire surface or a part of the surface of the ceramic member.

It is possible to use an inkjet method, a screen printing, a splay process, a stamp process, etc. to apply the outer peripheral coating member onto the surface of the ceramic member. For example, it is preferable to apply the outer peripheral coating member within a range of 0.1 to 0.3 grams onto an area of 4 cm×7 cm square. The coated layer contains the first particles, the second particles, and the third particles.

It is acceptable to form the coated layer on the surface of the ceramic member by the following method.

First, the outer peripheral coating member is applied on a carrier such as polyethylene (PE) film, and dried so as to form a coated layer before transfer printing.

Next, an adhesive is applied on or adheres onto the coated layer before transfer printing. The coated layer before transfer printing and the adhesive layer form a sheet member.

For example, a laser beam is irradiated on the overall area or a part of the sheet member composed of the coated layer before transfer printing and the adhesive layer containing the outer peripheral coating member. This irradiation generates a colored area. It is possible to use a $CO_2$ laser.

It is possible to perform a selective laser beam irradiation so as to form a part of a predetermined pattern (for example, a QR code (Registered Trademark), a bar code, a character, a number, a symbol, etc.) This process generates a colored pattern on the coated layer. It is possible to use the coated layer with a predetermined pattern as identification information of the ceramic member.

For example, it is possible to use a catalyst member as the ceramic member. The catalyst member is composed of the base member made of the ceramic member and a catalyst component (for example, a noble metal) supported on the surface of the base member. For example, the ceramic member is made of cordierite. There is the catalyst member as the ceramic product, in which the coated layer is formed on the entire surface or a part of the surface of the ceramic product.

Exemplary Embodiment 1

1. Hereinafter, a description will be given of the production of forming each of outer peripheral coating members S1 to S27 according to the exemplary embodiment 1.

Inorganic particles are added little by little into the dispersion medium while the dispersion medium is stirred for thirty minutes. Next, other components are added to the mixture and stirred for five minutes to produce the outer peripheral coating member S1. The above processes are performed at a normal temperature.

The dispersion medium, to be used for producing the outer peripheral coating member S1, is a mixture of 44.48 weight parts of water, and 3.56 weight parts of film forming agent (2,2,4-trimethyl-1,3-pentanediol).

The inorganic particles, to be used for producing the outer peripheral coating member S1, are 79.87 weight parts of particles of titanium oxide (having an average particle of 7 nm), 16.02 weight parts of particles of zirconium oxide (having an average particle of 5 nm), and 19.94 weight parts of particles of niobium oxide (having an average particle of 15 nm).

Such particles of titanium oxide are one example of the first particles. Such particles of zirconium oxide are one example of the second particles. Such particles of niobium oxide are one example of the third particle.

Other components forming the outer peripheral coating member S1 are as follows:

Acrylic resin emulsion (one kind of synthetic resins): 17.79 weight parts, Defoaming agent (mineral oil): 0.18 weight parts, Wetting agent (alkyl alcohol ethylene oxide adduct): 0.18 weight parts, UV fluorescent agent (rare earths): 1.78 weight parts, and Dispersion medium (polycarboxylic acid): 1.78 weight parts.

In the same way of producing the outer peripheral coating member S1, the exemplary embodiment produced the outer peripheral coating members S2 to S27. The outer peripheral coating members S2 to S27 were produced by using different dispersion medium (volatile component), different inorganic particles, and other components shown in Table 1 to Table 4.

TABLE 1

| | KINDS OF INORGANIC PARTICLES | PARTICLE SIZE | S1 P1 | S2 P2 | S3 P3 | S4 P4 | S5 P5 | S6 P6 | S7 P7 | S8 P8 |
|---|---|---|---|---|---|---|---|---|---|---|
| INORGANIC PARTICLES | TITANIUM OXIDE | 0.5 nm | | | | 79.87 | | | | |
| | | 3 nm | | | | | | | | |
| | | 7 nm | 79.87 | | | | | | 79.87 | 79.87 |
| | | 15 nm | | 79.87 | 79.87 | | | | | |
| | | 75 nm | | | | | 79.87 | | | |
| | | 220 nm | | | | | | | | |
| | | 250 nm | | | | | | | | |
| | | 300 nm | | | | | | | | |
| | | 1000 nm | | | | | | 79.87 | | |
| | ZIRCONIUM OXIDE | 0.7 nm | | | | | 18.48 | | | |
| | | 5 nm | 16.02 | | 18.48 | | | | | |
| | | 40 nm | | 14.79 | | | | 17.25 | 16.02 | 30.81 |
| | | 200 nm | | | | 13.55 | | | | |
| | NIOBIUM OXIDE | 0.6 nm | | | | 265.81 | | | | |
| | | 8 nm | | | 5.32 | | | | | |
| | | 15 nm | 19.94 | | | | 19.94 | 13.29 | 6.65 | 106.32 |
| | | 32 nm | | 29.24 | | | | | | |
| | | 105 nm | | | | | | | | 132.90 |
| | | 1.2 μm | | | | | | 19.94 | | |
| | | 22 μm | | | | | | | 1.33 | |
| | | 50 μm | | | | | | 6.65 | | |
| | | 400 μm | | | | | | | | |
| | ALUMINUM OXIDE | 7.5 nm | | | | | 12.75 | | | |
| OTHER COMPONENTS | ACRYLIC RESIN EMULSION (NON-VOLATILE COMPONENTS) | | 17.79 | 17.79 | 17.79 | 17.79 | 17.79 | 17.79 | 17.79 | 17.79 |
| | DEFOAMING AGENT | | 0.18 | 0.18 | 0.18 | 0.18 | 0.18 | 0.18 | 0.18 | 0.18 |
| | WETTING AGENT | | 0.18 | 0.18 | 0.18 | 0.18 | 0.18 | 0.18 | 0.18 | 0.18 |
| | UV FLUORESCENT AGENT | | 1.78 | 1.78 | 1.78 | 1.78 | 1.78 | 1.78 | 1.78 | 1.78 |
| | DISPERSION AGENT | | 1.78 | 1.78 | 1.78 | 1.78 | 1.78 | 1.78 | 1.78 | 1.78 |
| | TOTAL SUM OF NON-VOLATILE COMPONENTS | | 137.53 | 145.60 | 125.38 | 380.94 | 159.39 | 152.05 | 125.57 | 371.61 |
| | WEIGHT RATIO OF ZIRCONIUM OXIDE/TITANIUM OXIDE | | 0.20 | 0.19 | 0.23 | 0.17 | 0.23 | 0.22 | 0.20 | 0.39 |
| | MOLAR RATIO OF Zr ATOM/Ti ATOM | | 0.13 | 0.12 | 0.15 | 0.11 | 0.15 | 0.14 | 0.13 | 0.25 |
| | MOLAR RATIO OF Nb ATOM/Ti ATOM | | 0.15 | 0.22 | 0.04 | 2.00 | 0.20 | 0.25 | 0.06 | 1.80 |
| | MOLAR RATIO OF Al ATOM/Ti ATOM | | 0.00 | 0.00 | 0.00 | 0.00 | 0.25 | 0.00 | 0.00 | 0.00 |
| VOLATILE COMPONENTS | WATER | | 44.48 | 44.48 | 44.48 | 44.48 | 44.48 | 44.48 | 44.48 | 44.48 |
| | FILM FORMING AGENT | | 3.56 | 3.56 | 3.56 | 3.56 | 3.56 | 3.56 | 3.56 | 3.56 |
| EVALUATION TEST | COLORING BY IRRADIATION OF $CO_2$ LASER BEAMS | | ○ | ○ | ○ | ○ | ○ | ○ | ○ | ○ |
| | COLORING AFTER HEAT RESISTANCE TEST (850° C. × 6 HOURS) | | S | S | S | A | A | A | S | S |

TABLE 2

| | KINDS OF INORGANIC PARTICLES | PARTICLE SIZE | S9 P9 | S10 P10 | S11 P11 | S12 P12 | S13 P13 | S14 P14 | S15 P15 | S16 P16 |
|---|---|---|---|---|---|---|---|---|---|---|
| INORGANIC PARTICLES | TITANIUM OXIDE | 0.5 nm | | | | | | | | |
| | | 3 nm | | | | 79.87 | | | | |
| | | 7 nm | 79.87 | 79.87 | 79.87 | | | 79.87 | 79.87 | 79.87 |
| | | 15 nm | | | | | 79.87 | | | |
| | | 75 nm | | | | | | | | |
| | | 220 nm | | | | | | | | |
| | | 250 nm | | | | | | | | |
| | | 300 nm | | | | | | | | |
| | | 1000 nm | | | | | | | | |
| | ZIRCONIUM OXIDE | 0.7 nm | | | | | | | | |
| | | 5 nm | | | 3.70 | 4.93 | 6.16 | 2.46 | | |
| | | 40 nm | 17.25 | 17.25 | | | | | 1.85 | 5.55 |
| | | 200 nm | | | | | | | | |
| | NIOBIUM OXIDE | 0.6 nm | | | | | | | | |
| | | 8 nm | | | 13.29 | 1.33 | | | | |
| | | 15 nm | 39.87 | | | | | 3.99 | 3.99 | 39.87 |
| | | 32 nm | | | | | 6.65 | | | |

TABLE 2-continued

| | KINDS OF INORGANIC PARTICLES | PARTICLE SIZE | S9 P9 | S10 P10 | S11 P11 | S12 P12 | S13 P13 | S14 P14 | S15 P15 | S16 P16 |
|---|---|---|---|---|---|---|---|---|---|---|
| | | 105 nm | | | | | | | | |
| | | 1.2 μm | | | 6.65 | | | | | |
| | | 22 μm | | | | | | | 1.33 | |
| | | 50 μm | | | | | | | | 5.32 |
| | | 400 μm | 53.16 | | | | | | | |
| | ALUMINUM OXIDE | 7.5 nm | | 77.49 | | | | | | |
| OTHER COMPONENTS | ACRYLIC RESIN EMULSION (NON-VOLATILE COMPONENTS) | | 17.79 | 17.79 | 17.79 | 17.79 | 17.79 | 17.79 | 17.79 | 17.79 |
| | DEFOAMING AGENT | | 0.18 | 0.18 | 0.18 | 0.18 | 0.18 | 0.18 | 0.18 | 0.18 |
| | WETTING AGENT | | 0.18 | 0.18 | 0.18 | 0.18 | 0.18 | 0.18 | 0.18 | 0.18 |
| | UV FLUORESCENT AGENT | | 1.78 | 1.78 | 1.78 | 1.78 | 1.78 | 1.78 | 1.78 | 1.78 |
| | DISPERSION AGENT | | 1.78 | 1.78 | 1.78 | 1.78 | 1.78 | 1.78 | 1.78 | 1.78 |
| | TOTAL SUM OF NON-VOLATILE COMPONENTS | | 211.86 | 196.32 | 125.21 | 107.83 | 114.38 | 109.36 | 112.73 | 146.99 |
| | WEIGHT RATIO OF ZIRCONIUM OXIDE/TITANIUM OXIDE | | 0.22 | 0.22 | 0.05 | 0.06 | 0.08 | 0.03 | 0.02 | 0.07 |
| | MOLAR RATIO OF Zr ATOM/Ti ATOM | | 0.14 | 0.14 | 0.03 | 0.04 | 0.05 | 0.02 | 0.02 | 0.05 |
| | MOLAR RATIO OF Nb ATOM/Ti ATOM | | 0.70 | 0.00 | 0.15 | 0.01 | 0.05 | 0.04 | 0.07 | 0.05 |
| | MOLAR RATIO OF Al ATOM/Ti ATOM | | 0.00 | 1.52 | 0.00 | 0.00 | 0.00 | 0.00 | 0.00 | 0.00 |
| VOLATILE COMPONENTS | WATER | | 44.48 | 44.48 | 44.48 | 44.48 | 44.48 | 44.48 | 44.48 | 44.48 |
| | FILM FORMING AGENT | | 3.56 | 3.56 | 3.56 | 3.56 | 3.56 | 3.56 | 3.56 | 3.56 |
| EVALUATION TEST | COLORING BY IRRADIATION OF $CO_2$ LASER BEAMS | | ○ | ○ | ○ | ○ | ○ | ○ | ○ | ○ |
| | COLORING AFTER HEAT RESISTANCE TEST (850° C. × 6 HOURS) | | A | S | A | A | S | S | S | S |

TABLE 3

| | KINDS OF INORGANIC PARTICLES | PARTICLE SIZE | S17 P17 | S18 P18 | S19 P19 | S20 P20 | S21 P21 | S22 P22 | S23 P23 |
|---|---|---|---|---|---|---|---|---|---|
| INORGANIC PARTICLES | TITANIUM OXIDE | 0.5 nm | | | | | | | |
| | | 3 nm | | | | | | | 39.93 |
| | | 7 nm | 79.87 | 79.87 | 79.87 | 39.93 | 39.93 | 39.93 | |
| | | 15 nm | | | | | | | |
| | | 75 nm | | | | | | | |
| | | 220 nm | | | | 39.93 | | | |
| | | 250 nm | | | | | 39.93 | | 39.93 |
| | | 300 nm | | | | | | 39.93 | |
| | | 1000 nm | | | | | | | |
| | ZIRCONIUM OXIDE | 0.7 nm | | | | | | | |
| | | 5 nm | 92.42 | 0.62 | 3.70 | | | 17.25 | |
| | | 40 nm | | | | 17.25 | 17.25 | | 17.25 |
| | | 200 nm | | | | | | | |
| | NIOBIUM OXIDE | 0.6 nm | | | | | | | |
| | | 8 nm | | | | | | | |
| | | 15 nm | | | | 13.29 | 13.29 | 13.29 | 13.29 |
| | | 32 nm | 398.71 | | | | | | |
| | | 105 nm | | | | | | | |
| | | 1.2 μm | | | 53.16 | 19.94 | 19.94 | 19.94 | 19.94 |
| | | 22 μm | | | | | | | |
| | | 50 μm | | 29.24 | | | | | |
| | | 400 μm | | | | | | | |
| | ALUMINUM OXIDE | 7.5 nm | | | 5.10 | | | | |
| OTHER COMPONENTS | ACRYLIC RESIN EMULSION (NON-VOLATILE COMPONENTS) | | 17.79 | 17.79 | 17.79 | 17.79 | 17.79 | 17.79 | 17.79 |
| | DEFOAMING AGENT | | 0.18 | 0.18 | 0.18 | 0.18 | 0.18 | 0.18 | 0.18 |
| | WETTING AGENT | | 0.18 | 0.18 | 0.18 | 0.18 | 0.18 | 0.18 | 0.18 |
| | UV FLUORESCENT AGENT | | 1.78 | 1.78 | 1.78 | 1.78 | 1.78 | 1.78 | 1.78 |
| | DISPERSION AGENT | | 1.78 | 1.78 | 1.78 | 1.78 | 1.78 | 1.78 | 1.78 |
| | TOTAL SUM OF NON-VOLATILE COMPONENTS | | 592.71 | 131.43 | 163.53 | 152.05 | 152.05 | 152.05 | 152.05 |
| | WEIGHT RATIO OF ZIRCONIUM OXIDE/TITANIUM OXIDE | | 1.16 | 0.01 | 0.05 | 0.22 | 0.22 | 0.22 | 0.22 |
| | MOLAR RATIO OF Zr ATOM/Ti ATOM | | 0.75 | 0.01 | 0.03 | 0.14 | 0.14 | 0.14 | 0.14 |
| | MOLAR RATIO OF Nb ATOM/Ti ATOM | | 3.00 | 0.22 | 0.40 | 0.25 | 0.25 | 0.25 | 0.25 |
| | MOLAR RATIO OF Al ATOM/Ti ATOM | | 0.00 | 0.00 | 0.10 | 0.00 | 0.00 | 0.00 | 0.00 |
| VOLATILE COMPONENTS | WATER | | 44.48 | 44.48 | 44.48 | 44.48 | 44.48 | 44.48 | 44.48 |
| | FILM FORMING AGENT | | 3.56 | 3.56 | 3.56 | 3.56 | 3.56 | 3.56 | 3.56 |
| EVALUATION TEST | COLORING BY IRRADIATION OF $CO_2$ LASER BEAMS | | ○ | ○ | ○ | ○ | ○ | ○ | ○ |
| | COLORING AFTER HEAT RESISTANCE TEST (850° C. × 6 HOURS) | | A | A | A | S | S | S | S |

TABLE 4

| KINDS OF INORGANIC PARTICLES | | PARTICLE SIZE | S24 P24 | S25 P25 | S26 P26 | S27 P27 |
|---|---|---|---|---|---|---|
| INORGANIC PARTICLES | TITANIUM OXIDE | 0.5 nm | | | | |
| | | 3 nm | | | | |
| | | 7 nm | 79.87 | 79.87 | | |
| | | 15 nm | | | 79.87 | 79.87 |
| | | 75 nm | | | | |
| | | 220 nm | | | | |
| | | 250 nm | | | | |
| | | 300 nm | | | | |
| | | 1000 nm | | | | |
| | ZIRCONIUM OXIDE | 0.7 nm | | | | |
| | | 5 nm | | | 1.85 | 36.97 |
| | | 40 nm | | 98.58 | | |
| | | 200 nm | | | | |
| | NIOBIUM OXIDE | 0.6 nm | | | | |
| | | 8 nm | | | | |
| | | 15 nm | | | | |
| | | 32 nm | | | | |
| | | 105 nm | | | | |
| | | 1.2 μm | | | | |
| | | 22 μm | | | | |
| | | 50 μm | | | | |
| | | 400 μm | | | | |
| | ALUMINUM OXIDE | 7.5 nm | | | | |
| OTHER COMPONENTS | ACRYLIC RESIN EMULSION (NON-VOLATILE COMPONENTS) | | 17.79 | 17.79 | 17.79 | 17.79 |
| | DEFOAMING AGENT | | 0.18 | 0.18 | 0.18 | 0.18 |
| | WETTING AGENT | | 0.18 | 0.18 | 0.18 | 0.18 |
| | UV FLUORESCENT AGENT | | 1.78 | 1.78 | 1.78 | 1.78 |
| | DISPERSION AGENT | | 1.78 | 1.78 | 1.78 | 1.78 |
| TOTAL SUM OF NON-VOLATILE COMPONENTS | | | 101.58 | 200.15 | 103.42 | 138.54 |
| WEIGHT RATIO OF ZIRCONIUM OXIDE/TITANIUM OXIDE | | | 0.00 | 1.23 | 0.02 | 0.46 |
| MOLAR RATIO OF Zr ATOM/Ti ATOM | | | 0.00 | 0.80 | 0.02 | 0.30 |
| MOLAR RATIO OF Nb ATOM/Ti ATOM | | | 0.00 | 0.00 | 0.00 | 0.00 |
| MOLAR RATIO OF Al ATOM/Ti ATOM | | | 0.00 | 0.00 | 0.00 | 0.00 |
| VOLATILE COMPONENTS | WATER | | 44.48 | 44.48 | 44.48 | 44.48 |
| | FILM FORMING AGENT | | 3.56 | 3.56 | 3.56 | 3.56 |
| EVALUATION TEST | COLORING BY IRRADIATION OF $CO_2$ LASER BEAMS | | ○ | Δ | ○ | Δ |
| | COLORING AFTER HEAT RESISTANCE TEST (850° C. × 6 HOURS) | | D | C | D | C |

The exemplary embodiment prepared the outer peripheral coating members S20 to S23, each of which contains two types of titanium oxides having a different particle size. Accordingly, the particles of titanium oxide contained in each of the outer peripheral coating members S20 to S23 have two peak values R1 in a distribution of radial diameters thereof.

For example, because the outer peripheral coating member S20 contains two types of particles of titanium oxide having an average particle size of 7 nm and particles of titanium oxide having an average particle size of 220 nm, the outer peripheral coating member S20 provides a distribution of particle sizes of the titanium oxide having two peak values, i.e. the peak value of 7 nm and the peak value of 220 nm.

Similarly, the outer peripheral coating member S21 provides a distribution of particle sizes of the titanium oxide having two peak values, i.e. the peak value of 7 nm and the peak value of 250 nm.

Similarly, the outer peripheral coating member S22 provides a distribution of particle sizes of the titanium oxide having two peak values, i.e. the peak value of 7 nm and the peak value of 300 nm.

Similarly, the outer peripheral coating member S23 provides a distribution of particle sizes of the titanium oxide having two peak values, i.e. the peak value of 3 nm and the peak value of 250 nm.

Each of the outer peripheral coating members S5 to S9, S11, S14, S15, and S20-S23 contains two types of particles of niobium oxide having a different particle size. Accordingly, the particles of niobium oxide contained in outer peripheral coating members S5 to S9, S11, S14, S15, and S20-S23 have two peak values R3 of radial diameter.

For example, because the outer peripheral coating member S5 contains two types of particles of niobium oxide having an average particle size of 15 nm and particles of niobium oxide having an average particle size of 50 μm, the outer peripheral coating member S5 provides a distribution of particle sizes of the niobium oxide having two peak values, i.e. the peak value of 15 nm and the peak value of 50 μm.

Similarly, the outer peripheral coating member S6 provides a distribution of particle sizes of the niobium oxide having two peak values, i.e. the peak value of 15 nm and the peak value 1.2 μm.

Similarly, the outer peripheral coating member S7 provides a distribution of particle sizes of the niobium oxide having two peak values, i.e. the peak value of 15 nm and the peak value of 22 μm.

Similarly, the outer peripheral coating member S8 provides a distribution of particle sizes of the niobium oxide having two peak values, i.e. the peak value of 15 nm and the peak value of 105 nm.

Similarly, the outer peripheral coating member S9 provides a distribution of particle sizes of the niobium oxide having two peak values, i.e. the peak value of 15 nm and the peak value of 400 μm.

Similarly, the outer peripheral coating member S11 provides a distribution of particle sizes of the niobium oxide having two peak values, i.e. the peak value of 8 nm and the peak value of 1.2 μm.

Similarly, each of the outer peripheral coating members S14 and S15 provides a distribution of particle sizes of the niobium oxide having two peak values, i.e. the peak value of 15 nm and the peak value of 22 μm.

Similarly, each of the outer peripheral coating member S20 to S23 provides a distribution of particle sizes of the niobium oxide having two peak values, i.e. the peak value of 15 nm and the peak value of 1.2 μm.

Table 1 to Table 4 show a blending amount in weight parts of each of components such as a dispersion medium (volatile component), inorganic particles and other components. Further, Table 1 to Table 4 show a weight ratio of zirconium oxide/titanium oxide which represents a ratio in weight of titanium oxide contained in the second particles to titanium oxide contained in the first particles in each of the outer peripheral coating member.

In Table 1 to Table 4, the mole ratio of [Zr atoms/Ti atoms] represents a ratio of the number of moles of zirconium atom contained in the second particles to the number of moles of titanium atom contained in the first particles in the outer peripheral coating member.

Further, in Table 1 to Table 4, the mole ratio of [Nb atoms/Ti atoms] represents a ratio of the number of moles of niobium atom contained in the third particles to the number of moles of titanium atom contained in the first particles in the outer peripheral coating member.

Further, in Table 1 to Table 4, the mole ratio of [Al atoms/Ti atoms] represents a ratio of the number of moles of aluminum atom contained in the third particles to the number of moles of titanium atom contained in the first particles in the outer peripheral coating member.

2. Hereinafter, a description will be given of the production of the ceramic products.

Each of the outer peripheral coating members S1 to S27 is applied on an outer peripheral surface of a monolith (which is one example of the ceramic member) made of cordierite by using an ink jet spray method. These monoliths are dried at a normal temperature to produce the coated layer so that the coated layer has a 4 cm×7 cm rectangle area. An applied amount of each of the outer peripheral coating members S1 to S27 is within a range of 0.1 to 0.3 grams per the square area.

Figure 3:
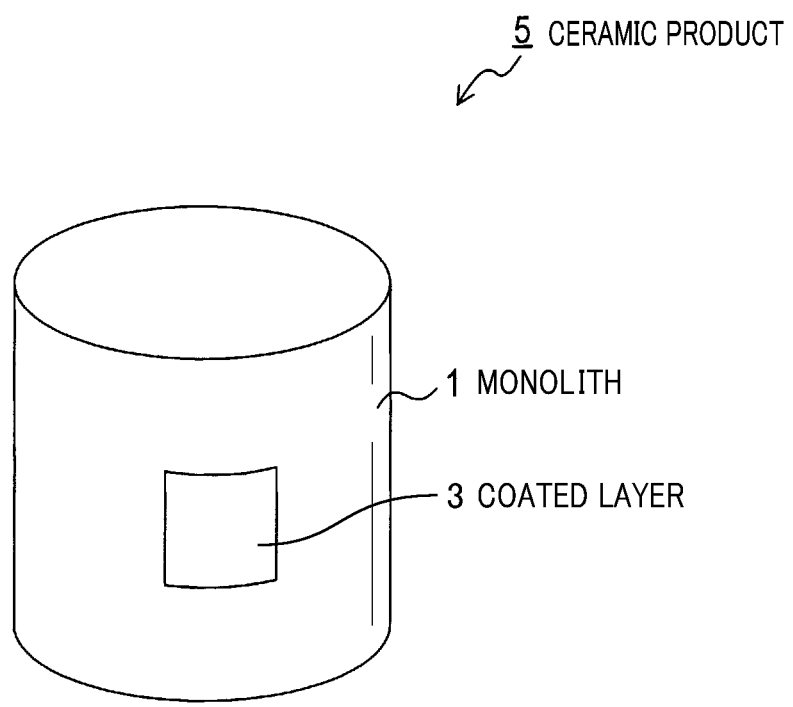
FIG. 3 is a perspective view showing a structure of a ceramic product according to the present invention.

The process produces the ceramic product 5 shown in FIG. 3 in which the coated layer 3 is formed on a part of the surface of the monolith 1. Hereinafter, the ceramic products, produced by applying the outer peripheral coating member Si onto the surface of the monolith, will be referred by using Pi (i=1 to 27), respectively.

The coated layer 3 formed on each of the ceramic products P1 to P27 contains the first particles, the second particles and the third particles. The first particles contain titanium oxide, the second particles contain zirconium oxide, and the third particles contain niobium oxide or aluminum oxide.

3. Hereinafter, a description will be given of the evaluation of the ceramic products P1 to P27.

The following evaluations were performed for the ceramic products P1 to P27.

(1) In the colored area of the coated layer, a $CO_2$ laser beam (27 W, 300 nm/sec) was irradiated on an area having a print range of 200 nm×30 nm of the coated layer on each ceramic product. The degree of the colored area irradiated by the laser beam was evaluated by the following standard.

O: It is easily to recognize a difference in color contrast between an area (hereinafter, the irradiated area) onto which the laser beam was irradiated and an area (hereinafter, will be referred to as the non-irradiated area) onto which no laser beam was irradiated.

Δ: No clear difference in color contrast between the irradiated area and the non-irradiated area.

X: Impossible to detect difference in color contrast between the irradiated area and the non-irradiated area.

Table 1 to Table 4 show the evaluation results of the difference in color contrast of each of the ceramic products. In the ceramic products having the evaluation result "O" of the color contrast, the color of the coated layer before laser beam irradiation was a white color, and the color of the coated layer after the irradiation of the laser beam was a black color.

(2) Hereinafter, a description will be given of the evaluation results of the heat resistance of the coated layer in each of the ceramic products.

A $CO_2$ laser beam (27 W, 300 nm/sec) was irradiated on an area of 200 nm×30 nm of the coated layer on each ceramic product. The laser beam was irradiated every 50 μm intervals. After the irradiation, the coated layer was heated at a temperature of 850° C. over 6 hours.

The evaluation of the heat resistance of each of the ceramic products was performed by the following method.

S: Extremely clear difference in color contrast between the irradiated area and the non-irradiated area.

A: Clear difference in color contrast between the irradiated area and the non-irradiated area.

B: Unclear difference in color contrast between the irradiated area and the non-irradiated area.

C: Barely detectable difference in color contrast between the irradiated area and the non-irradiated area, but to barely detect this difference.

D: No detectable difference in color contrast between the irradiated area and the non-irradiated area.

Table 1 to Table 4 show the evaluation results in hear resistance of the outer peripheral coating members S1 to S27

4. Hereinafter, a description will be given of the effects of the outer peripheral coating members and the ceramic products according to the present invention.

(1) It is possible for the ceramic products P1 to P23 to generate a clear colored area having various colors by irradiating a laser beam onto this part.

(2) It is difficult for the colored area to fade even if the colored area is exposed at strict environment as a high temperature after the formation of the colored area by the irradiation of the laser beam.

The concept of the present invention is not limited by the exemplary embodiments previously described. It is possible to apply the present invention to various applications within the scope of the present invention.

For example, it is acceptable to use a ceramic member other than a catalyst base member, to which the outer peripheral coating member according to the present invention is applied. In addition, it is acceptable to apply the outer peripheral coating member onto a part of the overall area of another material (for example, metal) other than ceramic member.

Further, it is acceptable to irradiate another laser beam other than the $CO_2$ laser means so as to generate a colored area on the coated layer. Still further, it is acceptable to use a heating method other than laser beam irradiation so as to generate a colored area on the coated layer.

REFERENCE SIGNS LIST

1 Monolith, 3 Coated layer, and 5 Ceramic product.

The invention claimed is:

1. An outer peripheral coating member comprising:
   first particles containing titanium oxide;
   second particles containing zirconium oxide;
   third particles containing niobium oxide or aluminum oxide; and
   a dispersion medium, wherein:
   the first particles have not less than two different peak values R1 in a distribution of particle size thereof, and
   one of the peak values R1 of the particle sizes of the first particles is within a range of 1 to 50 nm, and the other peak value R1 is within a range of 100 to 500 nm.

2. The outer peripheral coating member according to claim 1, wherein the third particles have not less than the two different peak values R3 in the distribution of particle sizes thereof.

3. The outer peripheral coating member according to claim 2, wherein the one peak of the values R3 is within a range of 1 to 100 nm, and the other peak value R3 is within a range of 0.15 to 300 μm.

4. The outer peripheral coating member according to claim 1, wherein the outer peripheral coating member contains zirconium atoms within a range of 0.01 to 0.5 mole per 1 mole of titanium atoms.

5. The outer peripheral coating member according to claim 1, wherein the outer peripheral coating member contains zirconium atoms within a range of 0.1 to 0.15 mole, and niobium atoms or aluminum atoms within a range of 0.03 to 2.5 mole per 1 mole of titanium atoms.

6. The outer peripheral coating member according to claim 1, wherein the outer peripheral coating member contains zirconium atoms within a range of 0.01 to 0.05 mole, and niobium atoms within a range of 0.02 to 0.1 mole per 1 mole of titanium atoms.

7. A ceramic product comprising:
   a ceramic member; and
   the coated layer, which has been formed by applying the outer peripheral coating member according to claim 1 onto the surface of the ceramic member.

8. A ceramic product comprising:
   a ceramic member; and
   a layer formed on a surface of the ceramic member, wherein
   the layer is made of first particles containing titanium oxide, second particles containing zirconium oxide, and third particles containing niobium oxide or aluminum oxide,
   the first particles have not less than two different peak values R1 in a distribution of particle size thereof, and
   one of the peak values R1 of the particle sizes of the first particles is within a range of 1 to 50 nm, and the other peak value R1 is within a range of 100 to 500 nm.

* * * * *